Nov. 19, 1940.　　　　　S. I. CORY　　　　　2,221,833
SYSTEM FOR MEASURING CONTACT REBOUNDING
Filed May 6, 1939
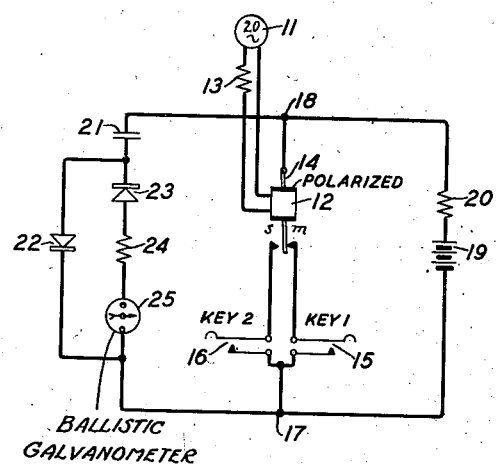
INVENTOR
S. I. CORY
BY
*J. W. Schmied*
ATTORNEY Patented Nov. 19, 1940

2,221,833

UNITED STATES PATENT OFFICE 2,221,833

SYSTEM FOR MEASURING CONTACT REBOUNDING

Samuel I. Cory, Towaco, N. J., assignor to Bell Telephone Laboratories, Incorporated, New York, N. Y., a corporation of New York Application May 6, 1939, Serial No. 272,125

6 Claims. (Cl. 175—183)

This invention relates to methods of and means for detecting rebounds and measuring the number of rebounds of contacts under the influence of electric currents or mechanical force. More specifically, it relates to measuring the so-called "chatter" of relay contacts. Chatter is important because it may determine to a large extent how the contacts are affected by the arcing which accompanies the opening of the relay contacts and, in addition, if the chatter is low it may affect the signal directly causing distortion even before the contacts have had time to deteriorate.

When a relay operates, the armature has a tendency to rebound, due to such causes as resiliency, momentum, etc. In the common language of the art, this rebounding is termed "chatter." As will be readily understood, each rebound or chatter has practically the same effect upon the contacts of a telegraph relay, for instance, as an additional operation of the relay. In designing relay armatures and contacts and in comparing the operation of relays, it is of importance that the measure of the chatter, or, in other words, the number of rebounds upon a single operation of the relay, be ascertained. Heretofore the oscillograph method has been the usual method employed for taking similar measurements.

The invention provides a method of measuring the number of rebounds which is superior to the ordinary oscillograph method in that the ease of operation is greater and the speed of operation increased, and that chatters of higher frequencies can be measured with accuracy.

The device of the applicant's invention consists broadly of electrical means for accomplishing the automatic registration upon a suitable indicating device of the number of rebounds of two contacts when the same are brought together in in the operation of a relay or other device.

More specifically, the invention resides in a chatter measuring device for electromagnetic relays under the influence of a changing current whereby the chatter at either or both of the relay contacts may be measured. The device comprises a normally charged main circuit including a source of potential, regulating resistance, a condenser and a rectifier, and two shunt paths connected across the main circuit and in series with the condenser. One of the shunt paths includes the relay armature in engageable relation with parallel paths, each parallel path having one of the relay contacts and a manually operated key and the other of the shunt paths includes a rectifier operable in a direction opposite to that of the rectifier in the main circuit, a regulating resistance and a ballistic galvanometer.

The invention will be clearly understood from the following detailed description of one desirable form of applicant's device and the operation thereof, when the same is read with reference to the accompanying drawing. The single figure of the drawing shows a circuit diagram of the chatter meter.

With reference to the details of the drawing, a source 11 of alternating current of the low frequency telegraph range is connected to a circuit including winding of relay 12 and resistance 13 for the purpose of operating the relay at a frequency corresponding to that of telegraph signals. Relay 12 is of the polarized type and armature 14 thereof is shown connected to the right-hand, or marking, contact. The marking contact and the left-hand, or spacing, contact, respectively, form parallel paths. Each of the paths includes a manually operated key, designated 15 and 16, and terminates in the main circuit at a common connection 17. The common connection 17, together with another common connection 18, terminates the shunt path across the main circuit which includes a source 19 of direct current, resistance 20, condenser 21 and copper-oxide rectifier 22. Connected in shunt across rectifier 22 are another rectifier 23 arranged to operate in a direction opposite to that of rectifier 22, resistance 24, and indicating meter 25.

The manually operated keys 15 and 16 are provided for the purpose of making tests first on the marking contact, then on the spacing contact, and then on both contacts.

Let it be assumed that relay 12 is operated at a given frequency, say, 20 cycles. As soon as armature 14 leaves its marking contact and while traveling to its spacing contact, condenser 21 is charged to the potential of battery 19 in a circuit extending from the positive pole of battery 19, resistance 20, condenser 21, rectifier 22 to the negative pole of battery 19. When armature 14 reaches its spacing contact, condenser 21 will discharge in a path including armature 14 and its spacing contact, manually operated key 16 in its closed position, meter 25, resistance 24, and rectifier 23. When armature 14 subsequently leaves its spacing contact, condenser 21 is again charged to the potential of battery 19 as hereinbefore described and, should the manually operated key 15 be operated, this charge will again be discharged through the path including armature 14 and its marking contact, manually operated key 15 in its closed position, meter 25, resistance 24 and rectifier 23. This operation is repeated as long as both of manually operated keys 15 or 16 are operated.

From the above description, it is readily understood that meter 25, which is of the ballistic galvanometer type, receives a current impulse each time armature 14 engages either one of its associated contacts, providing the corresponding manually operated keys connected therewith are operated, and no current impulse when the armature is disengaged. The deflection of the galvanometer needle will be proportional to the number of impulses through the meter and, since there is one impulse through the meter to each closing of a relay contact, it follows that the deflection of the galvanometer needle will likewise be proportional to the number of times the relay contact closes.

If there is no chatter of the relay contact, that is, no rebounding of the armature, the meter will receive one impulse per cycle of relay operation and will show a certain deflection, the amount of this deflection depending upon the frequency of operation of the relay. If, however, the relay chatters once, this chatter or rebounding being equivalent to a second operation of the relay, the deflection of the galvanometer needle will be twice as great as in the case of no chatter. Likewise, if there are two chatters or rebounds, the deflection of the galvanometer needle will be three times as great as in the first case, and so on. Accordingly, the number of chatters C may be ascertained by taking the observed deflection D, dividing this deflection by the amount of deflection corresponding to the base frequency X and subtracting one.

Unsteady reading on the galvanometer needle will indicate a variable amount of chatter, and steady reading will indicate systematic chatter.

It will be understood, of course, that the values of the condenser and the resistances in the circuit should be chosen so that the time of charging or discharging of the condenser will be shorter than the time during which the contact is open upon the fastest chatter to be observed.

It was found by actual test that the meter would indicate the presence of chatter of such small duration that they were hardly visible on a cathode ray oscillograph. When no chatter was present and with either key 15 or key 16 closed, but not both, the meter reading was 37. With both keys closed, the reading was 74. The reading of the meter was proportional to the number of chatter intervals, with key 15 closed, as in the observation of the marking pulses, the presence of one chatter interval would cause the reading to increase from 37 to 74. Two chatter intervals would cause the reading to increase to about 110. However, in many cases the meter indication varies over more or less of the scale because of variation in the chatter. During these tests some observations were made with the meter connected into a differential circuit and a balancing current flowing through one arm of the circuit so as to balance out the meter reading for the condition of no chatter. This causes the meter to indicate directly the number of chatters and, of course, made the reading independent of variation in the battery voltage. Applicant does not limit himself to the form of system described in detail above, nor to the specific use of this meter explained above, but claims as invention the following.

What is claimed is:

1. A system for measuring the number of rebounds of operable contacts comprising means including a rectifying element for storing a voltage charge when said contacts are opened, other means including another rectifying element for discharging said charge when said contacts are closed, and indicating means included in said other means for indicating and measuring the number of rebounds of said contacts.

2. A system for measuring the number of rebounds of operable contacts comprising a charging circuit including in series connection a source of potential, a resistance, a condenser, and a rectifier, a discharging circuit for said condenser including in series connection said operable contacts, a meter, a resistance and a rectifier, said meter, said resistance and said second-mentioned rectifier being included in a shunt path to said first-mentioned rectifier.

3. A system for measuring the number of rebounds of electromagnetic relay contacts comprising a relay and a source of reversing current therefor, an armature and contacts for said relay, a manually operable key for each of said contacts, a condenser, a charging circuit for said condenser including a source of potential, a resistance and a conducting element for impressing a voltage in one direction only when said armature is disengaged from said contacts, a discharging circuit for said condenser including another conducting element for impressing a voltage in the direction opposite to that of the first-mentioned element, a resistance and an indicating meter, said indicating meter giving a cumulative reading for the total number of times that said armature engages either or both of its upper contacts, depending on whether or not one or both of said manually operable keys are operated.

4. A system for measuring the number of rebounds of electromagnetic relay contacts comprising a relay and a source of varying current therefor, an armature and contacts for said relay, means including a unidirectional element for storing a voltage charge when said armature and said contacts are disengaged, other means including another unidirectional element for discharging said charge when said armature is engaged with one of said contacts, and indicating means included in said other means for measuring the number of rebounds of said one contact.

5. A system for measuring the number of rebounds of electromagnetic relay contacts comprising a relay and a source of varying current therefor, an armature and contacts for said relay, a charging circuit including in series connection a source of potential, an impedance element, a voltage storing device and a unidirectional element, a discharging circuit for said storing device including in series connection with said armature and said contacts a measuring device, a second impedance element, and a second unidirectional element, said measuring device, said second impedance element and said second unidirectional element being included in a shunt path to the first-mentioned unidirectional element.

6. Means for indicating the operation of a circuit closing element comprising a contact upon which said element closes, a circuit including a source of electromotive force closed thereby, a shunt circuit about the element and the contact, a condenser, a unidirectional device and a ballistic galvanometer in series in said shunt path, and an oppositely poled unidirectionally conducting device connected in shunt to said first device and said galvanometer.

SAMUEL I. CORY.